Patented Dec. 13, 1927.

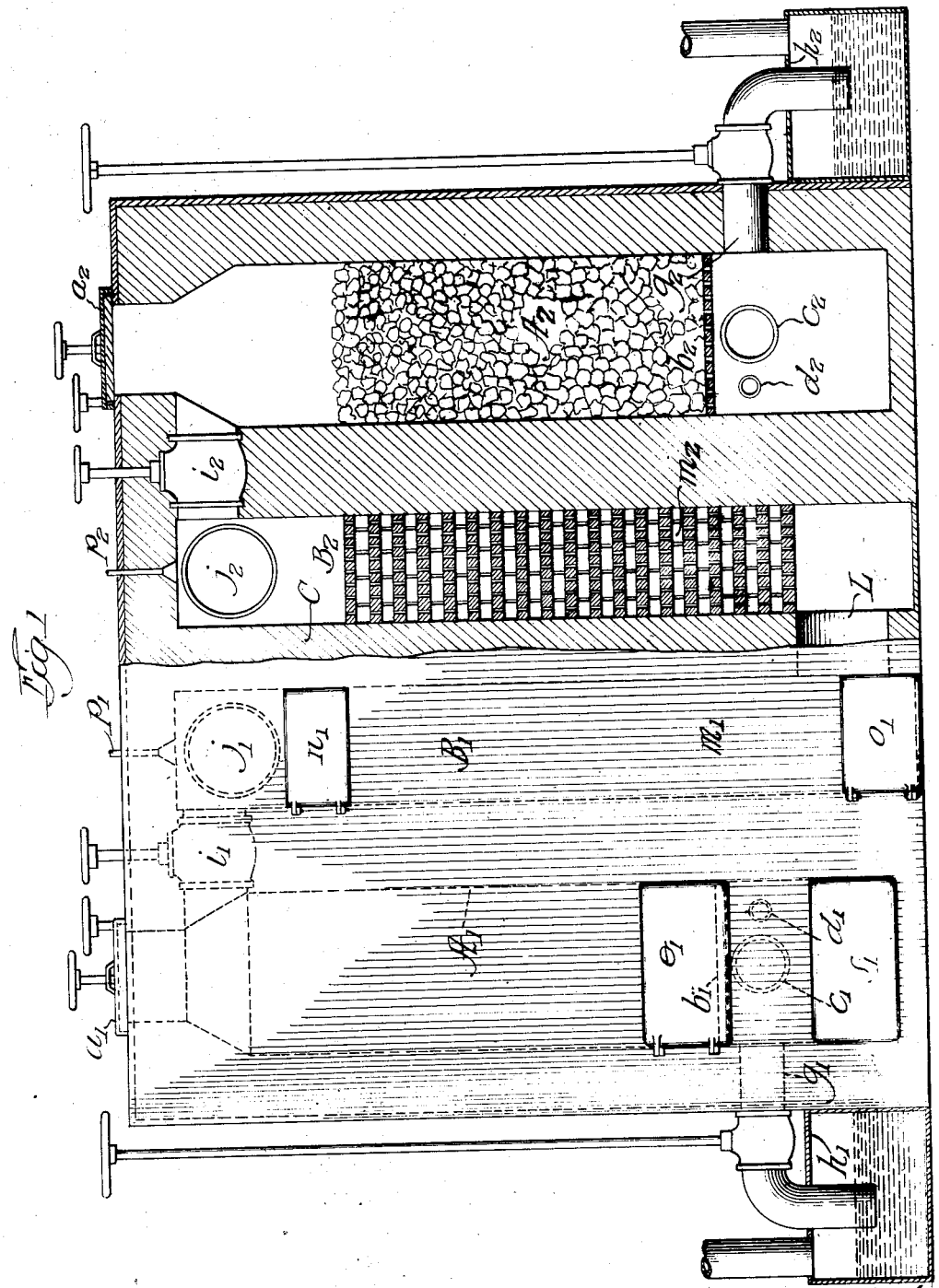

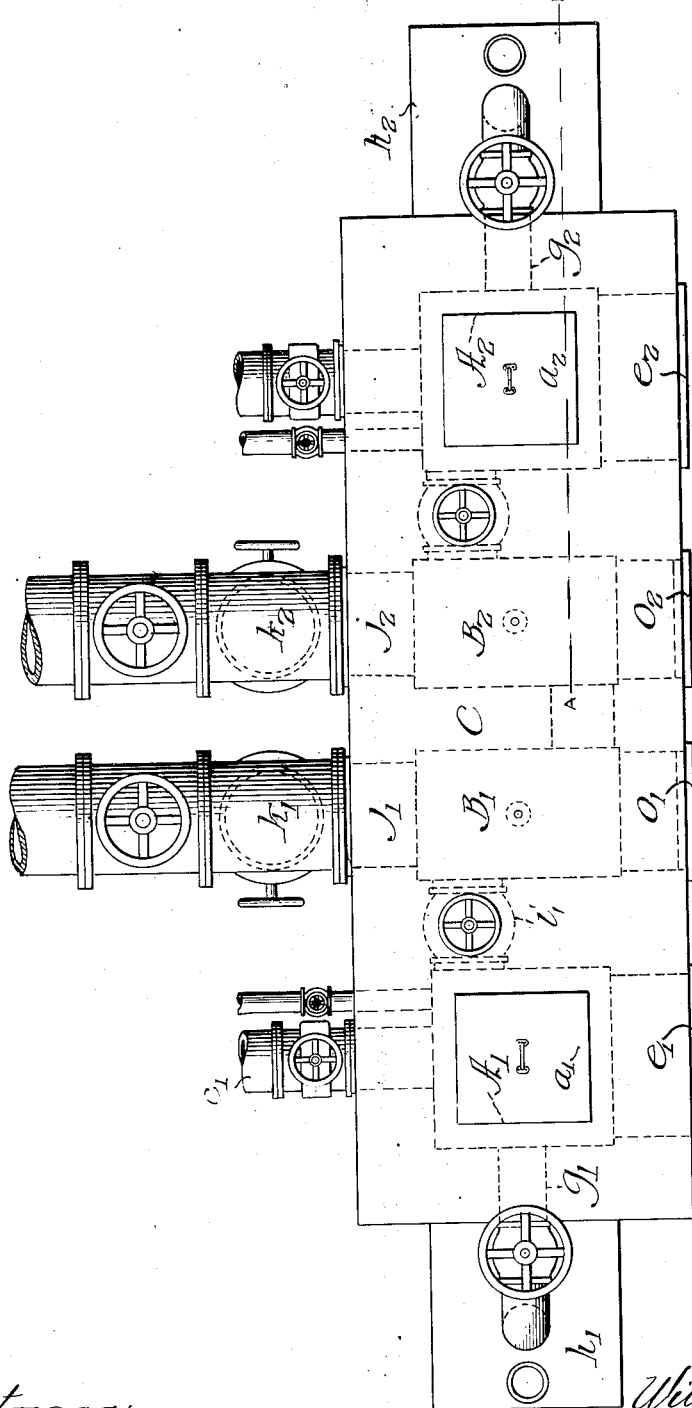

1,652,386

UNITED STATES PATENT OFFICE.

WILLIAM D. WILCOX, OF IDAHO FALLS, IDAHO.

PROCESS OF MAKING MIXED WATER GAS AND COAL GAS.

Application filed March 20, 1922. Serial No. 545,064.

This invention relates to the complete, or substantially complete, conversion of coal into fixed gases, the hydrocarbon volatiles of the coal being driven off and converted into gas by heat, while the fixed carbon residue is converted into water gas by the use of the well known method used in the water gas process.

It is my purpose to provide means for accomplishing this complete gasification with the least possible dissipation of heat and with a minimum of manipulation of the gas producing material employed. While the process resembles in some respects that described in my copending application No. 457,811, filed April 1, 1921, which has matured into Patent No. 1,624,644; there are differences in the procedure followed and in the design of the apparatus used which produce differences in the result obtained.

The process and the apparatus used in carrying it out may be more readily understood by reference to Figures 1 and 2. Figure 1 is a view in elevation showing parts in vertical section of the apparatus. Figure 2 is a plan view of the apparatus.

The apparatus consists of two gas generators, $A_1$ and $A_2$, which may be enclosed in a common casing or constructed independently in the usual cylindrical form. These generators are provided with similar working parts. $a_1$ and $a_2$ are charging doors in the top of each generator for the introduction of gas producing material. $b_1$ and $b_2$ are grates supporting the body of fuel in each generator. $c_1$ and $c_2$ are valve controlled inlets for the admission of air. $d_1$ and $d_2$ are valve controlled inlets for steam. $e_1$ and $e_2$ are clinkering doors and $f_1$ indicates an ash removal door and generator $A_2$ has a similar door which is not shown. Each generator has a valve controlled gas outlet, $g_1$ on generator $A_1$, and $g_2$ on generator $A_2$, discharging from below the grate into wash boxes, $h_1$ and $h_2$.

Passages, preferably valve controlled, $i_1$ and $i_2$, connect each of the generator chambers with an intermediate combustion chamber or superheater. This chamber is divided by a centrally located partition wall C into two similar chambers or superheaters, $B_1$ and $B_2$. In the upper part of each superheater are valve controlled waste gas outlets, $j_1$ and $j_2$, which, by means of valves, $k_1$ and $k_2$, are also made to serve as inlets for a secondary supply of air. L is an opening, or series of openings, in the lower part of the partition wall connecting the two superheaters. $m_1$ and $m_2$ are bodies of checker brick placed within the combustion chambers. $n_1$ is a manhole used in introducing the checker brick to chamber $B_1$ and a similar manhole which is not shown is used for chamber $B_2$. $o_1$ and $o_2$ are clean out doors for the removal of dust and ashes which may be deposited in the lower part of $B_1$ and $B_2$. $p_1$ and $p_2$ are oil sprays which may be added to the plant as desired in order to permit an enrichment of the gas. In beginning the operation, one of the generators is partially filled with coke, $A_1$ for example. The other, $A_2$, is filled with the same material nearly to the top. Combustion is established in each and continued until the coke has become slightly incandescent. Bituminous coal or similar fuel is then charged through $a_1$ into $A_1$ until it is nearly filled. $A_2$ is now operated as a water gas generator. During the blast period air is admitted below the grate of $A_2$ and $d_2$ is closed while the escaping gases pass into $B_2$ through $i_2$. At this point they are joined by a supply of air entering through $k_2$ and $j_2$ and are fully consumed within the chamber, imparting the heat generated by the combustion to the checker brick and wall surfaces and passing out at $j_1$ preferably into a waste heat boiler to be used in the generation of steam. During the steam run or gas making period, the air is shut off by closing the air valves. The valves $k_1$ and $k_2$ are also closed while the valve in passage $i_1$ is opened. The water gas generated by the admission of steam from $d_2$ in $A_2$ passes through $B_2$ and $B_1$, becoming highly superheated, thence into $A_1$ and down through the body of freshly charged coal therein, causing the volatiles of the coal to be given off as vapors and gases. In passing downward through the lower strata of incandescent coke in $A_1$ most of these vapors which would upon cooling condense as liquids are broken up into fixed gases. These gases mixed with the water gas from $A_2$ pass through the gas outlet pipe, $g_1$, into wash box $h_1$. When this procedure has been carried on for a time to be determined by operative experience the level of the coke in $A_2$ will have been greatly reduced by oxidation and the fresh coal in $A_1$ will have become substantially coked. Operation is now reversed. The fuel in $A_1$ is then blasted, the air blast gases being passed into the secondary combustion chambers $B_1$ and $B_2$, and fully consumed therein to heat the checkerbrick and discharged through outlet $j_2$. When the fuel is incandescent, the air is shut off and steam turned on and water gas is now generated in $A_1$ by admitting steam through $d_1$. The water gas generated is passed through the superheating chambers $B_1$ and $B_2$ into generator $A_2$ into which a charge of fresh coal has been introduced and out through $g_2$ into wash box $h_2$. It will be noted that in this procedure there is no heating through the walls, but all heat applied is heat generated by a combustion of the fuel itself brought into contact with the material to be heated by a current of gas. Where the several combustion chambers or superheaters are enclosed in a common casing properly lined with material which is relatively non-conducting and where the sensible heat of the blast gases is used to make steam, the total loss of heat is small and the thermal efficiency of the process is high. The volatiles of the coal are at no time submitted to a contact with oxygen by which they will be completely broken up, but only to such a degree of heat in the absence of air as is afforded by contact with the hot coke in the lower level of the generator necessary to crack or break them up into non-condensible gases. If care be employed in purging the combustion gases from the generator after the air blast and from the secondary combustion chambers, $B_1$ and $B_2$, the gaseous product will be an admixture of water gas and richer gases such as form what is commonly known as coal gas, with a smaller proportion of inert gases than usually results where coal is coked in ovens and cracks in the oven walls permit the entrance of flue gases into the interior of the retort to mix and be withdrawn with the conserved gas.

While in design of the apparatus and in the process followed much that is standard in the art has been used, the process as a whole is believed to be new and not to have been followed or employed at any time in the past and the results obtained are believed to be superior to those obtained by existing methods.

I claim:

A process for making mixed water gas and coal gas, which comprises; air blasting a fuel bed in one gas generator to incandescence, passing the blast gases into a superheater, having a baffle wall for conveying the gases downwardly and then upwardly, burning the blast gases therein and thereby heating the superheater, shutting off the air blast and then admitting steam to the base of the incandescent fuel, causing the resultant water gas to pass downwardly and then upwardly through the superheater and thereby superheating the water gas, passing the superheated water gas into the upper part of a second gas generator containing a fuel bed having an upper layer of coal, passing the water gas down through the fuel in the second generator, and thereby distilling the volatiles from the coal, withdrawing the resultant mixed water gas and coal gas from the base of the second gas generator, and periodically reversing the operation of the gas generators.

WILLIAM D. WILCOX.